(12) United States Patent
Hayashi (10) Patent No.: US 7,871,104 B2
(45) Date of Patent: Jan. 18, 2011

(54) VEHICLE SIDE AIRBAG APPARATUS

(75) Inventor: Shigeki Hayashi, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/902,693

(22) Filed: Sep. 25, 2007

(65) Prior Publication Data

US 2008/0079248 A1 Apr. 3, 2008

(30) Foreign Application Priority Data

Sep. 28, 2006 (JP) ............................. 2006-264596

(51) Int. Cl.
*B60R 21/207* (2006.01)
*B60R 21/231* (2006.01)

(52) U.S. Cl. .................... 280/730.2; 280/729; 280/739; 280/743.2

(58) Field of Classification Search ................ 280/729, 280/730.2, 739, 743.2
See application file for complete search history.

(56) References Cited

U.S. PATENT DOCUMENTS

| | | | | |
|---|---|---|---|---|
| 5,791,685 | A * | 8/1998 | Lachat et al. ............. | 280/743.1 |
| 6,231,070 | B1 | 5/2001 | Sunabashiri et al. | |
| 2003/0160433 | A1* | 8/2003 | Kumagai et al. ............ | 280/729 |
| 2003/0168836 | A1* | 9/2003 | Sato et al. ................ | 280/730.2 |
| 2004/0021304 | A1* | 2/2004 | Tanase et al. .............. | 280/729 |
| 2004/0119269 | A1* | 6/2004 | Yokota et al. ............. | 280/730.2 |
| 2004/0130127 | A1* | 7/2004 | Kurimoto et al. .......... | 280/729 |
| 2005/0023808 | A1* | 2/2005 | Sato et al. ................ | 280/730.2 |
| 2005/0062266 | A1* | 3/2005 | Steimke et al. ............ | 280/730.2 |
| 2005/0098985 | A1* | 5/2005 | Sullivan et al. ............ | 280/729 |
| 2005/0104342 | A1* | 5/2005 | Jackson et al. ........... | 280/730.2 |
| 2005/0184493 | A1* | 8/2005 | Hofmann et al. ......... | 280/730.2 |
| 2005/0189742 | A1* | 9/2005 | Kumagai et al. ......... | 280/730.2 |
| 2005/0248132 | A1* | 11/2005 | Wheelwright .............. | 280/729 |
| 2006/0001244 | A1* | 1/2006 | Taguchi et al. ............ | 280/729 |
| 2006/0022439 | A1* | 2/2006 | Bayley et al. ............. | 280/729 |
| 2006/0022441 | A1* | 2/2006 | Hayashi et al. ........... | 280/730.2 |
| 2006/0043702 | A1* | 3/2006 | Jamison ..................... | 280/729 |
| 2006/0071458 | A1* | 4/2006 | Sendelbach et al. ........ | 280/729 |
| 2006/0103119 | A1* | 5/2006 | Kurimoto et al. ........ | 280/730.2 |
| 2006/0103120 | A1* | 5/2006 | Kurimoto et al. ........ | 280/730.2 |

(Continued)

FOREIGN PATENT DOCUMENTS

DE 698 22 599 8/2004

(Continued)

OTHER PUBLICATIONS

Japanese Office Action dated Jun. 24, 2008.

(Continued)

*Primary Examiner*—Paul N. Dickson
*Assistant Examiner*—Barry Gooden, Jr.
(74) *Attorney, Agent, or Firm*—Finnegan, Henderson, Farabow, Garrett & Dunner, LLP (57) ABSTRACT

A side airbag of a vehicle side airbag apparatus has a concave portion that is provided at a position corresponding to the shoulder of an occupant and is thinner than other portions of the side airbag. The upper portion of the side airbag is formed to be deployed before the lower portion of the side airbag upon deployment of the side airbag.

14 Claims, 6 Drawing Sheets

U.S. PATENT DOCUMENTS

| | | |
|---|---|---|
| 2006/0131847 A1* | 6/2006 | Sato et al. ............. 280/730.2 |
| 2006/0175809 A1* | 8/2006 | Yamaji et al. ............ 280/729 |
| 2006/0232054 A1* | 10/2006 | Schlosser et al. ........ 280/743.2 |
| 2006/0267318 A1* | 11/2006 | Nishikaji et al. ........ 280/730.2 |
| 2007/0126220 A1* | 6/2007 | Huber et al. ............ 280/740 |
| 2007/0152430 A1* | 7/2007 | Wollin et al. ............ 280/729 |
| 2007/0200327 A1* | 8/2007 | Kloss et al. ............ 280/740 |
| 2007/0228699 A1* | 10/2007 | Bederka et al. ........ 280/730.2 |
| 2007/0267851 A1* | 11/2007 | Svenbrant et al. ........ 280/729 |
| 2008/0100045 A1* | 5/2008 | Fukawatase et al. .... 280/730.2 |

FOREIGN PATENT DOCUMENTS

| | | |
|---|---|---|
| DE | 60 2004 009 116 | 6/2008 |
| EP | 1 344 694 | 9/2003 |
| EP | 1 657 123 | 5/2006 |
| EP | 1 829 755 | 9/2007 |
| JP | 10-273010 | 10/1998 |
| JP | 2000-272463 | 10/2000 |
| JP | 2004-255908 | 9/2004 |
| JP | A-2004-291789 | 10/2004 |
| JP | A-2004-291845 | 10/2004 |
| JP | A-2005-119510 | 5/2005 |
| JP | 2006-008015 | 1/2006 |
| JP | 2006-062386 | 3/2006 |
| JP | 2006-82664 | 3/2006 |
| JP | 2006-142868 | 6/2006 |

OTHER PUBLICATIONS

German Office Action for DE 10 2007 045 504.8-56, dated Feb. 2, 2010.

* cited by examiner

FOLD LIKE BELLOWS FOR ACCELERATING AIRBAG DEPLOYMENT TO UPPER SIDE (OR MAY BE ROLLED)

FIG. 6B

ROLLED (OR MAY BE FOLDED LIKE BELLOWS)

FIG. 6A

FOLDING METHOD OF AIRBAG

PRIOR ART

VEHICLE SIDE AIRBAG APPARATUS

INCORPORATION BY REFERENCE

The disclosure of Japanese Patent Application No. 2006-264596 filed on Sep. 28, 2007 including the specification, drawings and abstract is incorporated herein by reference in its entirety.

BACKGROUND OF THE INVENTION

1. Field of the Invention

The invention relates to a vehicle side airbag apparatus.

2. Description of the Related Art

Japanese Patent Application Publication No. 2004-291845 (JP-A-2004-291845) describes a vehicle side airbag apparatus in which the thickness of the portion of the side airbag that is deployed to cover the part of the occupant's body from his or her shoulder or its proximal portion to his or her abdomen or its proximal portion to protect the chest of the occupant is smaller than the thickness of the portion of the side airbag that is deployed to protect the shoulder of the occupant or its proximal portion.

Figure 9:
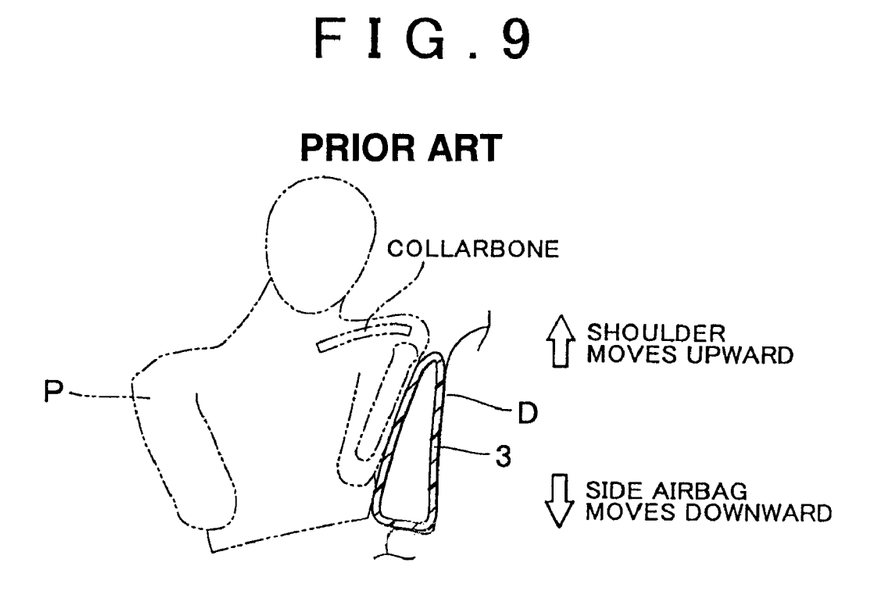
FIG. 9 is a cross-sectional view showing a related art vehicle side airbag apparatus and its surrounding in a state where the occupant's shoulder is moving upward after contacting the side airbag.

However, this vehicle side airbag apparatus involves the following problem. Because the collarbone of a human being is slanted upward from the breastbone to the shoulder (scapula), there is a possibility that the shoulder of the occupant P would move upward when it contacts the side airbag 3 as shown in FIG. 9. When the shoulder of the occupant P moves upward, the side airbag 3 moves downward in turn (the side airbag 3 moves to where the clearance between the occupant P and the door D in the lateral direction of the vehicle is large) and therefore the side airbag 3 may fail to restrain the shoulder of the occupant P sufficiently.

SUMMARY OF THE INVENTION

The invention provides a vehicle side airbag apparatus that ensures that the shoulder of the occupant is restrained by the side airbag in a stable manner.

The first aspect of the invention relates to a vehicle side airbag apparatus having a side airbag, an inflator that supplies gas to the side airbag, wherein (i) when the side airbag is in a deployed state, the upper end of the side airbag is located higher than a shoulder of an occupant and the lower end of the side airbag is located lower than the shoulder of the occupant, (ii) the side airbag has a concave portion which is provided at a position corresponding to the shoulder of the occupant in the up-down direction of the vehicle and which is thinner in the lateral direction of the vehicle than other portions of the side airbag, (iii) an upper portion of the side airbag that is located above the position corresponding to the shoulder of the occupant when the side airbag is in the deployed state is longer in the longitudinal direction of the vehicle than a lower portion of the side airbag that is located below the position corresponding to the shoulder of the occupant when the side airbag is in the deployed state, (iv) and the upper portion is formed to be deployed before the lower portion upon deployment of the side airbag.

According to the side airbag apparatus described above, the concave portion is provided at the position corresponding to the shoulder of the occupant and the concave portion is thinner than other portions of the side airbag and the upper portion of the side airbag is formed to be deployed before the lower portion of the side airbag upon deployment of the side airbag. Therefore, the shoulder of the occupant, when fit in the concave portion and its proximal portion, can be supported from the upper side of the vehicle as well as from the outer side of the vehicle in the lateral direction thereof. Thus, the shoulder of the occupant does not move upward when it contacts the side airbag. As such, the side airbag apparatus described above ensures that the shoulder of the occupant is supported by the side airbag in a stable manner as compared to the related-art side airbag apparatuses. Further, in the side airbag apparatus described above, the upper portion of the side airbag is formed longer than the lower portion of the side airbag in the longitudinal direction of the vehicle and the upper portion is formed to be deployed before the lower portion upon deployment of the side airbag. Therefore, when the upper portion of the side airbag is being deployed, the lower portion is also deployed by being pulled up by the deploying force of the upper portion. Thus, the lower portion can be deployed to between the occupant and the door before a sufficient amount of gas is supplied to the lower portion.

The second aspect of the invention relates to a side airbag for a vehicle side airbag apparatus. This side airbag includes: an upper inflation portion; a lower inflation portion that is provided below the upper inflation portion; a concave portion that is provided between the upper inflation portion and the lower inflation portion; and a connecting member that is provided at the concave portion and connects the inner face of the side airbag on the occupant side and the inner face of the side airbag on the side close to the outside of the vehicle. The concave portion is formed to be thinner than the upper inflation portion and the lower inflation portion when the side airbag is in a deployed state, and the upper inflation portion is longer than the lower inflation portion in the longitudinal direction of the vehicle, and the upper inflation portion is formed to be deployed before the lower inflation portion upon deployment of the side airbag.

BRIEF DESCRIPTION OF THE DRAWINGS

The foregoing and advantages of the invention will become apparent from the following description of example embodiments with reference to the accompanying drawings, wherein like numerals are used to represent like elements and wherein.

DETAILED DESCRIPTION OF THE EMBODIMENTS

Figure 5:
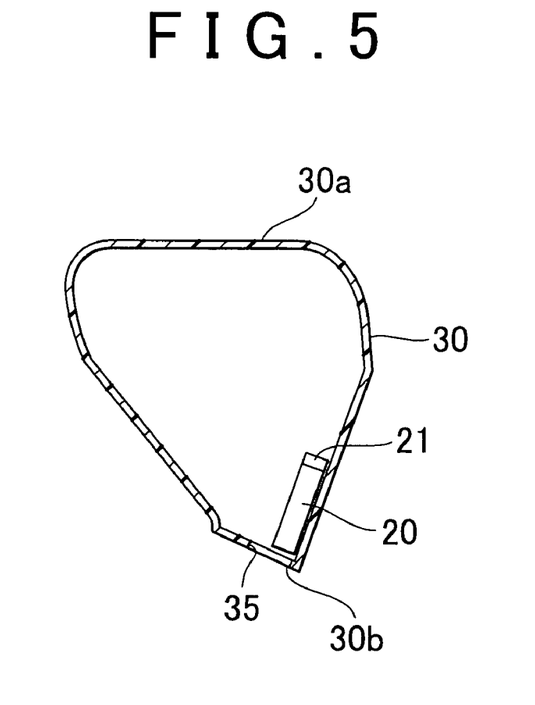
FIG. 5 is a cross-sectional view of the vehicle side airbag apparatus according to the first example embodiment of invention.
Figure 6A:
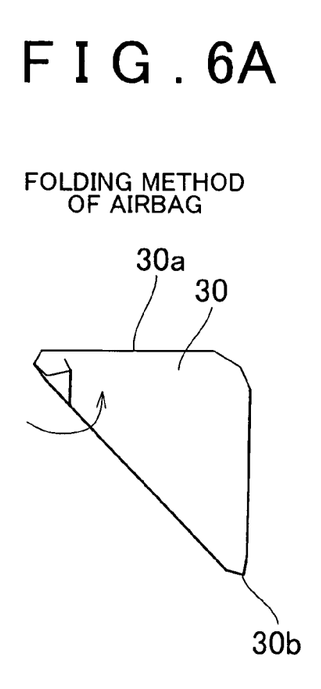
FIG. 6A is a perspective view schematically showing the beginning of the process of folding the side airbag of the vehicle side airbag apparatus according to the first example embodiment of the invention.
Figure 6B:
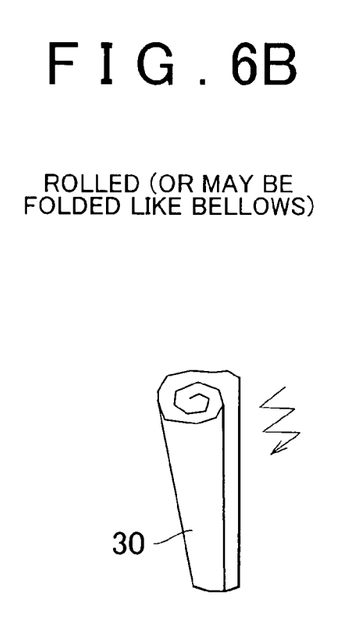
FIG. 6B is a perspective view schematically showing the state where the side airbag of the vehicle side airbag apparatus according to the first example embodiment of the invention is rolled in the longitudinal direction of the vehicle.
Figure 6C:
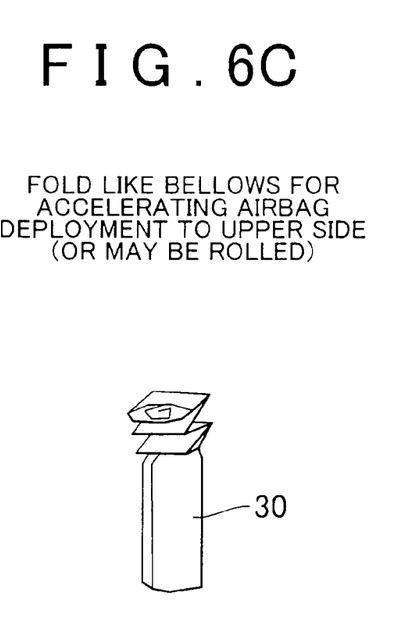
FIG. 6C is a perspective view schematically showing the state where the side airbag of the vehicle side airbag apparatus according to the first example embodiment of the invention is folded in the up-down direction of the vehicle.
Figure 7:
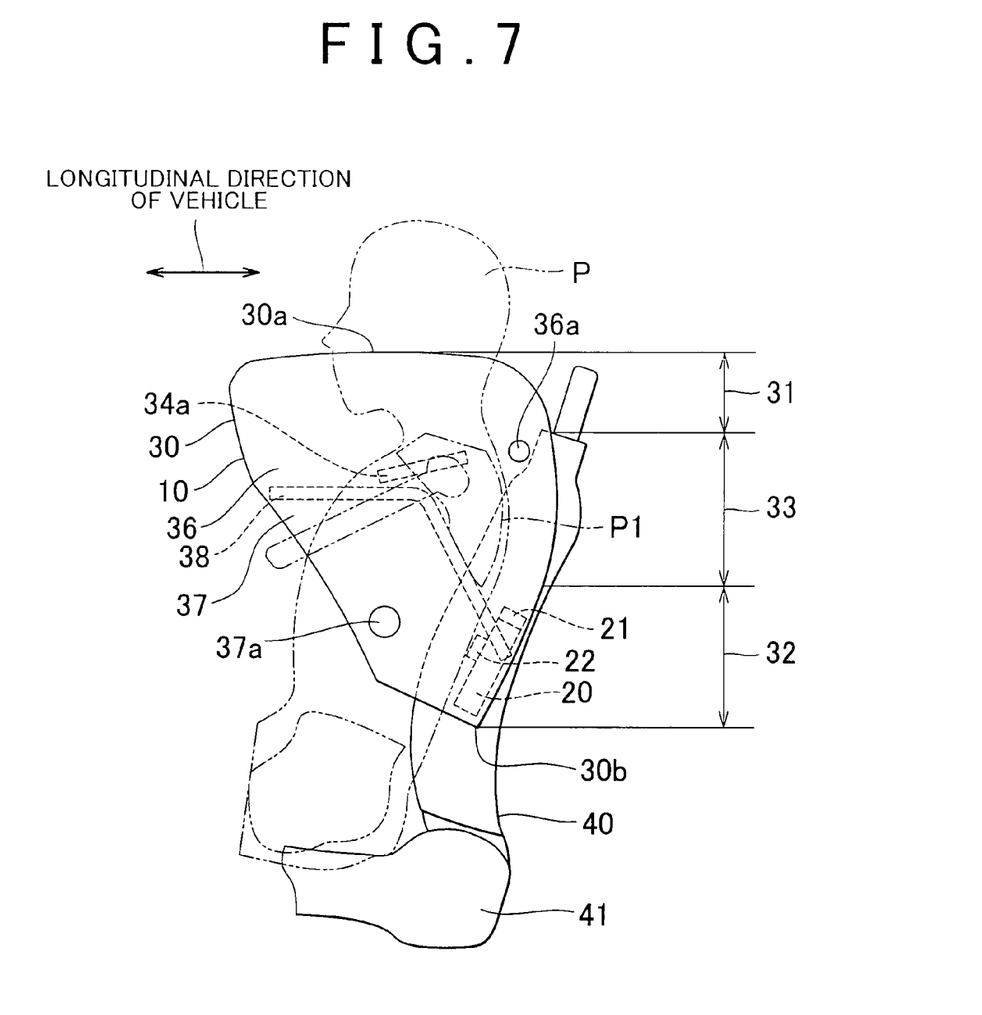
FIG. 7 is a side view shoring a vehicle side airbag apparatus according to the second example embodiment of the invention and its surrounding.
Figure 8:
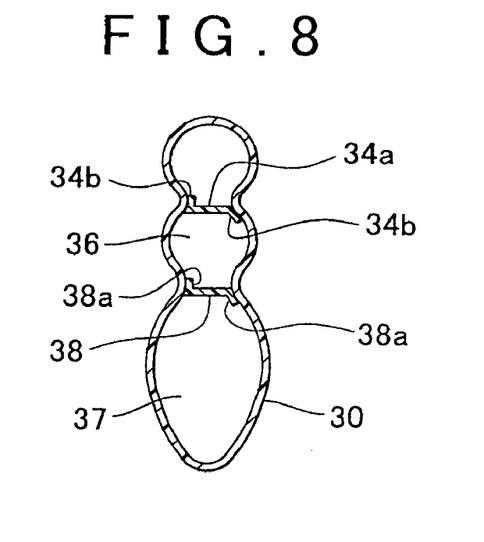
FIG. 8 is a cross-sectional view showing the side airbag of the vehicle side airbag apparatus of the second example embodiment of invention.

Hereinafter, vehicle side airbag apparatuses (will hereinafter be referred to as "side airbag apparatuses" where necessary) according to the first and second example embodiments of the invention will be described with reference to FIG. 1 to FIG. 8. FIG. 1 to FIG. 6 show the vehicle side airbag apparatus according to the first example embodiment of the invention, and FIG. 7 and FIG. 8 show the vehicle side airbag apparatus according to the second example embodiment of the invention. Note that the airbag strap shown in FIG. 4 and the airbag folding/rolling method shown in FIG. 6 are applicable also to the second example embodiment of the invention. In FIG. 1 to FIG. 8, like elements and components are denoted by like numerals.

First Example Embodiment

First, the configuration of a side airbag apparatus 10 according to the first example embodiment of the invention will be described with reference to FIG. 1 to FIG. 6. The side airbag apparatus 10 of the first example embodiment is embedded in a seatback 40 (only its frame is shown in the drawings).

Figure 1:
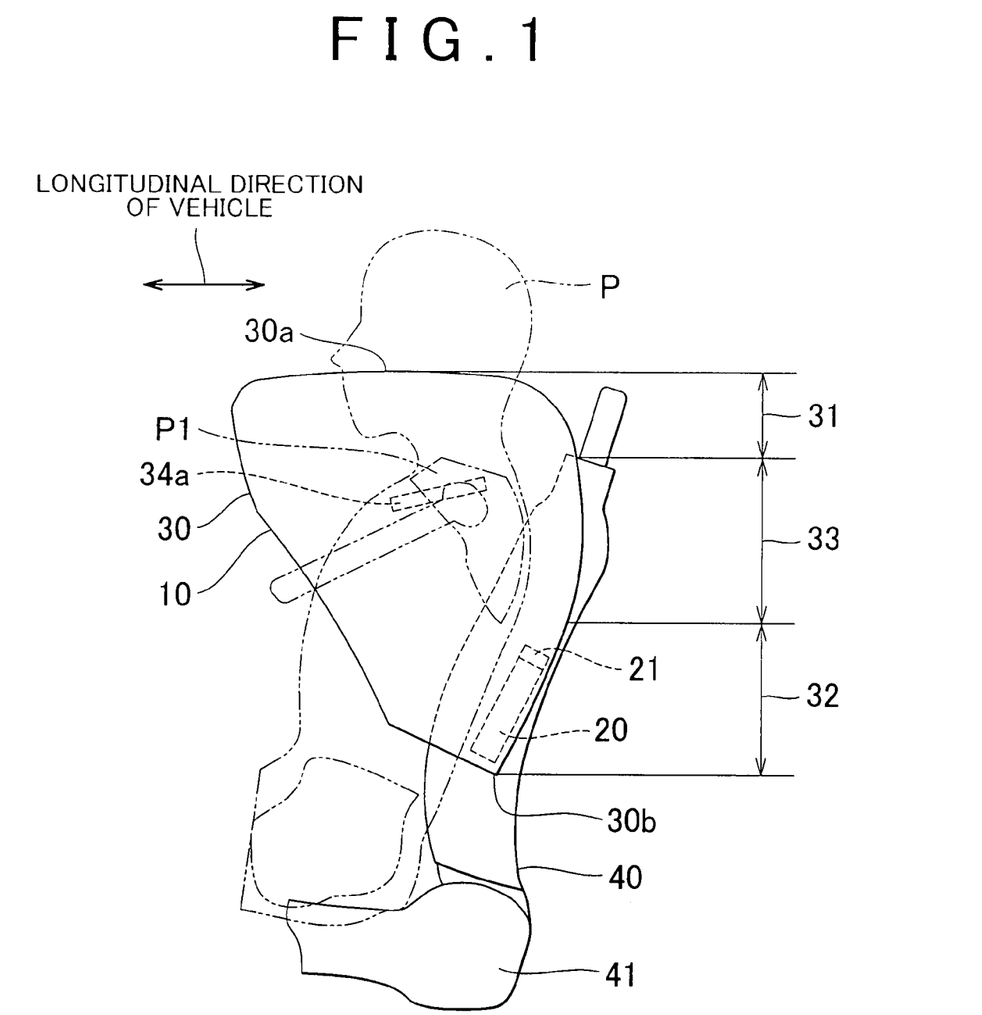
FIG. 1 is a side view showing a vehicle side airbag apparatus according to the first example embodiment of the invention and its surrounding.

The seatback 40, as shown in FIG. 1, is used to support the back of an occupant P. The seatback 40 is arranged at the vehicle rear side end of a seat cushion 41 (only its frame is shown in the drawings) on which the occupant P is seated. The seatback 40 is tiltable with respect to the seat cushion 41 in the longitudinal direction of the vehicle. A head rest (not shown in the drawings) is provided on the seatback 40 to support the head of the occupant P.

The side airbag apparatus 10 is embedded in the seatback 40. The side airbag apparatus 10 is provided with an inflator 20 and a side airbag 30 that is folded or rolled in the seatback 40. The side airbag is deployed by the gas discharged (supplied) from the inflator 20.

The inflator 20 is disposed in the side airbag 30. The inflator 20 has an inflation gas outlet 21 from which gas is discharged upward (this includes any obliquely upward directions above the horizontal direction as well as the vertical direction).

When the side airbag 30 is in the deployed state, the side airbag 30 covers the area extending from a shoulder (scapula) P1 to the chest of the occupant P. When the side airbag 30 is in the deployed state, an upper end 30a of the side airbag 30 is located higher than the shoulder P1 of the occupant P and lower than the head of the occupant P, and a lower end 30b of the side airbag 30 is located lower than the chest of the occupant P and higher than the waist of the occupant P.

The side shape of the deployed side airbag 30 is similar to or substantially similar to the side shape of the shoulder (scapula) P1. Specifically, the side shape of the deployed side airbag 30 is triangular or generally triangular with its dimension in the longitudinal direction of the vehicle decreasing continuously from the upper side to the lower side.

Figure 2:
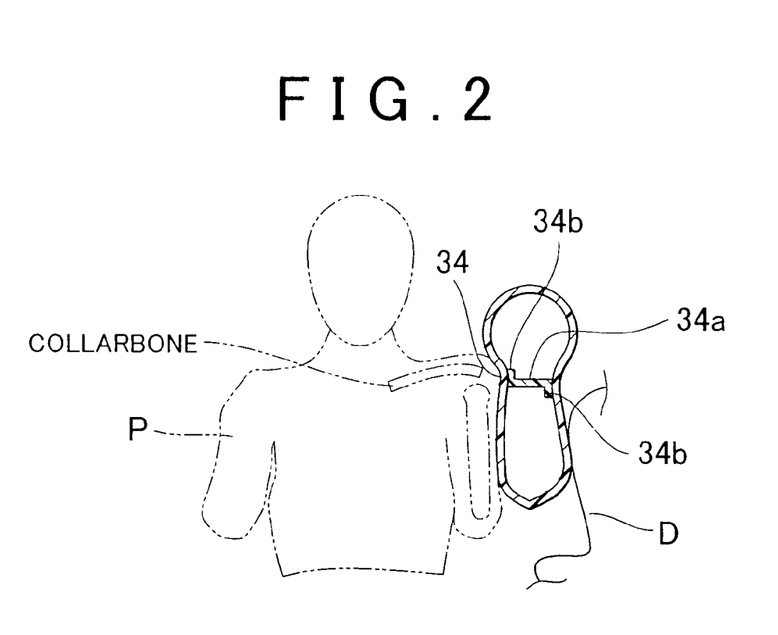
FIG. 2 is a cross-sectional view showing the vehicle side airbag apparatus according to the first example embodiment of the invention and its surrounding in the early stage of a side collision.

The side airbag 30 has an upper portion 31 that is, when the side airbag 30 is in the deployed state, located higher than the upper end of the shoulder P1 of the occupant P, a lower portion 32 that is, when the side airbag 30 is in the deployed state, located lower than the shoulder P1 of the occupant P, a shoulder-corresponding portion 33 that is, when the side airbag 30 is in the deployed state, located at a position corresponding to the shoulder P1 of the occupant P, and a concave portion 34 at which the dimension of the deployed side airbag 30 in the lateral direction of the vehicle is smaller than at other portions (refer to FIG. 2). The dimension of the upper portion 31 in the longitudinal direction of the vehicle is lager than that of the lower portion 32.

The concave portion 34 is provided at the shoulder-corresponding portion 33. More specifically, as shown in FIG. 2, the concave portion 34 is provided at the portion of the side airbag 30 that supports the outer side of the collarbone of the occupant P or its proximal portion. The thickness of the side airbag 30 at the concave portion 34 in the lateral direction of the vehicle is set to a value which excludes zero and enables the shoulder P1 of the occupant P to be fit in the concave portion 34 and its proximal portion.

The concave portion 34 is formed using a strap 34a made of a material that may either be the same as or different from the material of the base cloth of the side airbag 30. For example, the concave portion 34 is formed by sewing left and right folded portions 34b of the strap 34a to the left and right base cloths of the side airbag 30, respectively, (refer to FIG. 4). Alternatively, the concave portion 34 may be formed by adhering or welding the left and right folded portions 34b of the strap 34a to the left and right base cloths of the side airbag 30, respectively.

The concave portion 34 is formed at the side airbag 30 such that the shoulder of the occupant P, regardless of the size of the occupant P, can be fit in the concave portion 34 and its proximal portion. Specifically, the strap 34a is slanted such that, when the side airbag 30 is in the deployed state, the front end of the strap 34a of the side airbag 30, which is the end of the strap 34a on the front side of the vehicle, is located lower than the rear end of the strap 34a, which is the end of the strap 34a on the rear side of the vehicle, so that a person having a size of AF05 (the fifth smallest person out of 100 American females) to AF95 (the 95th smallest person out of the same 100 American females), which are identified by the U.S. regulation, can properly fit to the deployed side airbag 30. Namely, the strap 34a is arranged such that it appears to be extending downward when viewed from the rear end. For example, the strap 34a extends straight obliquely such that the front end of the strap 34a is located lower than the rear end of the strap 34a. Alternatively, the strap 34a may have at least one curving portion and extend obliquely such that the front end of the strap 34a is located lower than the rear end of the strap 34a. Note that FIG. 1 shows a case where the strap 34a extends straight obliquely such that the front end of the strap 34a is located lower than the rear end of the strap 34a.

Referring to FIGS. 6A, 6B, and 6C, the side airbag 30 is rolled or folded like bellows first in the longitudinal direction of the vehicle and then in the up-down direction of the vehicle and then installed in the seatback 40. Note that this arrangement is applicable also to the second example embodiment of the invention.

The side airbag 30 of the first example embodiment has only one chamber. Referring to FIG. 5, the side airbag 30 has an insert hole 35 that is provided at or near the lower end of the side airbag 30. The inflator 20 is inserted into the insert hole 35. The insert hole 35 is located in the seatback 40. The insert hole 35 serves as a ventilation hole for discharging the gas to the outside after it has been used to deploy the side airbag 30.

Next, the advantages of the side airbag apparatus 10 of the first example embodiment will be described. (a) As shown in FIG. 6A to 6C, the side airbag 30 is first folded in the longitudinal direction of the vehicle and then folded or rolled in the up-down direction of the vehicle and then installed in the seatback 40. Because an airbag is deployed in the inverse order to that in which it was folded or rolled, the arrangement of the first example embodiment causes the upper portion 31 of the side airbag 30 to be deployed before the lower portion 32 upon deployment of the side airbag 30. (b) Because the inflation gas outlet 21 of the inflator 20 is adapted to discharge gas upward as shown in FIG. 1, the upper portion 31 of the side airbag 30 is deployed before the lower portion 32. Owing to at least one of the features (a) and (b), the upper portion 31 of the side airbag 30 can be deployed before the lower portion 32. Further, because the upper portion 31 is located higher than the shoulder P1 of the occupant P and the distance between the occupant P and a door D in the lateral direction of the vehicle is larger at the neck (head) of the occupant P than at and below the shoulder P1 of the occupant P, the side airbag 30 can be easily deployed as compared to the case where the upper portion 31 of the side airbag 30 is arranged at the same height as or lower than the shoulder P1. Note that the inflator 20 is activated by an airbag controller (not shown in the drawings) when a side collision sensor (not shown in the drawings) arranged at a predetermined position in the side portion of the vehicle detects a side collision.

Figure 3:
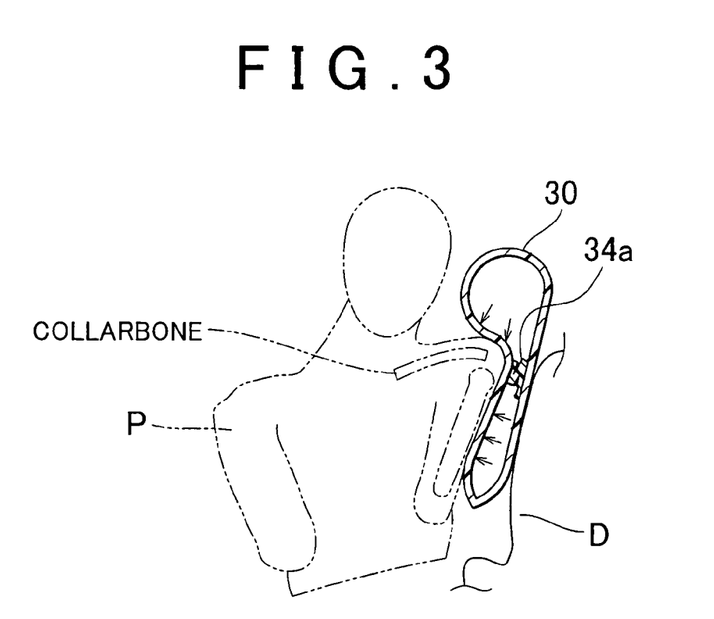
FIG. 3 is a cross-sectional view showing the vehicle side airbag apparatus according to the first example embodiment of the invention and its surrounding in the late stage of a side collision.
Figure 4:
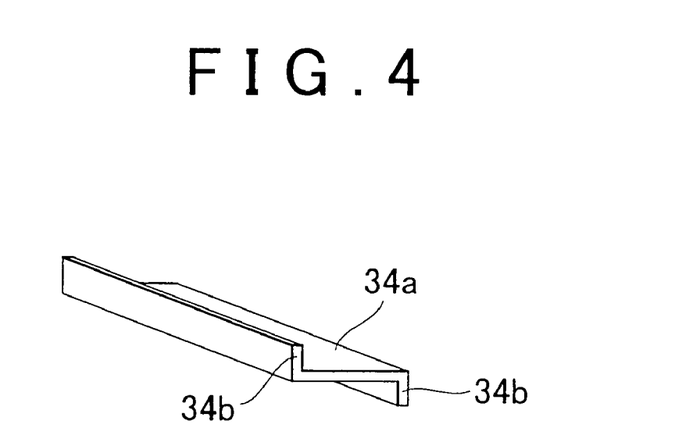
FIG. 4 is a perspective view showing a strap for the vehicle side airbag apparatus according to the first example embodiment of the invention.

The concave portion 34 is provided at the shoulder-corresponding portion 33 of the side airbag 30 and the upper portion 31 is arranged to be deployed before the lower portion 32. Therefore, as shown in FIG. 3, the shoulder P1 of the occupant P, when fit in the concave portion 34 of the side airbag 30 and its proximal portion, can be supported from the upper side of the vehicle as well as from the outer side of the vehicle in the lateral direction thereof, and therefore the shoulder P1 of the occupant P does not move upward when it contacts the side airbag 30. As such, the side airbag 30 restrains the shoulder P1 of the occupant P in a stable manner during a side collision of the vehicle.

Further, the dimension of the upper portion 31 of the side airbag 30 in the longitudinal direction of the vehicle is made larger than the dimension of the lower portion 32 of the side airbag 30 in the longitudinal direction and the upper portion 31 is arranged to be deployed before the lower portion 32 upon deployment of the side airbag 30. Therefore, when the upper portion 31 is being deployed, the lower portion 32 is also deployed by being pulled up by the deploying force of the upper portion 31. Thus, the lower portion 32 can be deployed to between the occupant P and the door D before a sufficient amount of gas is supplied into the lower portion 32 (before the lower portion 32 is sufficiently inflated). Thus, even when the door D is intruding fast into the vehicle compartment during a collision of the vehicle, the lower portion 32 of the side airbag 30 can be reliably deployed to between the occupant P and the door D. Note that the above-described advantages can be also obtained in the second example embodiment of the invention.

The first example embodiment further provides the following advantages. That is, because the insert hole 35 into which the inflator 20 is inserted is located in the seatback 40 and the insert hole 35 is used as a ventilation hole for discharging the gas to the outside after it has been used to deploy the side airbag 30, the gas is discharged into the seatback 40 from the side airbag 30 and therefore the occupant(s) does not directly contact the gas discharged from the side airbag 30.

Second Example Embodiment

Next, the characteristics of the side airbag apparatus according to the second example embodiment of the invention will be described with reference to FIG. 7 and FIG. 8. The side airbag 30 of the second example embodiment has an upper chamber 36 and a lower chamber 37. When the side airbag 30 is in the deployed state, the lower chamber 37 is located lower than the upper chamber 36 and contacts the occupant P with a pressure lower than that with which the upper chamber 36 contacts the occupant P. When the side airbag 30 is in the deployed state, the upper chamber 36 supports a relatively strong part of the body of the occupant P (shoulder P1) and the lower chamber 37 supports a relatively weak part of the body of the occupant P (chest, ribs).

The upper chamber 36 and the lower chamber 37 are partitioned from each other by a partition wall 38. Note that the partition wall 38 may be either arranged such that the upper chamber 36 and the lower chamber 37 are completely partitioned from each other or such that the upper chamber 36 and the lower chamber 37 are partitioned from each other with at least one communication passage formed therebetween. Referring to FIG. 8, the partition wall 38 is formed by, for example, sewing the left and right folded portions 38a of the partition wall 38 to the left and right base cloths of the side airbag 30, respectively. Alternatively, the partition wall 38 may be formed by adhering or welding the left and right folded portions 38a of the partition wall 38 to the left and right base cloths of the side airbag 30, respectively. Note that the partition wall 38 is provided lower than the strap 34a as shown in FIG. 7.

Referring to FIG. 7, the upper chamber 36 has an upper chamber ventilation hole 36a and the lower chamber 37 has a lower chamber ventilation hole 37a. The cross-sectional area of the upper chamber ventilation hole 36a is smaller than that of the lower chamber ventilation hole 37a.

The inflator 20 supplies gas to the upper chamber 36 via the inflation gas outlet 21. The inflator 20 also has a second inflation gas outlet 22 for supplying gas to the lower chamber 37. The amount of gas supplied from the inflation gas outlet 21 is set larger than the amount of gas supplied from the second inflation gas outlet 22.

Next, the unique advantages of the second example embodiment will be described. In the second example embodiment, as described above, the side airbag 30 has the lower chamber 37 which is located lower than the upper chamber 36 when the side airbag 30 is in the deployed state and which is inflated to a lower pressure than that to which the upper chamber 36 is inflated. Therefore, the relatively strong part of the body of the occupant P (shoulder P1) is relatively tightly supported by the side airbag 30, and the relatively weak part of the body of the occupant P is relatively gently supported by the side airbag 30. That is, the load that is imposed on the relatively weak part of the body of the occupant P when the occupant P contacts the side airbag 30 decreases.

Further, because the inflator 20 supplies gas to the upper chamber 36 through the inflation gas outlet 21 and to the lower chamber 37 through the second inflation gas outlet 22, the pressure of the lower chamber 37 may be made lower than the pressure of the upper chamber 36 by setting the amount of gas discharged from the inflation gas outlet 21 and the amount of gas discharged from the second inflation gas outlet 22 appropriately (the pressures of the upper chamber 36 and the lower chamber 37 can be controlled as needed).

Further, because the cross-sectional area of the upper chamber ventilation hole 36a is smaller than that of the lower chamber ventilation hole 37a, the pressure of the lower chamber 37 can be made lower than that of the upper chamber 36 independent of the amount of gas supplied from the inflation gas outlet 21 of the inflator 20 to the upper chamber 36 and the amount of gas supplied from the second inflation gas outlet 22 of the inflator 20 to the lower chamber 37. That is, the pressures of the upper chamber 36 and the lower chamber 37 can be adjusted as needed based on the cross-sectional areas of the upper chamber ventilation hole 36a and the lower chamber ventilation hole 37a.

What is claimed is:

1. A vehicle side airbag apparatus, including a side airbag mounted in a seatback of a seat of the vehicle, wherein an upper end of the side airbag is located above a shoulder region and lower than an upper end of a head region, a lower end of the side airbag is located lower than the shoulder region and lower than a chest region, when the side airbag is in a deployed state, and the side airbag covers an area extending from the shoulder region to the chest region, comprising:
   an inflator that supplies gas to the side airbag, wherein:
   the side airbag has an exterior surface defining a concave portion which is provided at a position corresponding to the shoulder region in the up-down direction of the vehicle and which is thinner in the lateral direction of the vehicle than other portions of the side airbag, wherein an inner face of the side airbag located interior of the concave portion on a first side is spaced apart from an inner face of the side airbag on a second side in the lateral direction of the vehicle when the side airbag is inflated;
   an upper portion of the side airbag that is located above the position corresponding to the shoulder region when the side airbag is in the deployed state is longer in the longitudinal direction of the vehicle than a lower portion of the side airbag that is located below the position corresponding to the shoulder region when the side airbag is in the deployed state;
   a side shape of the deployed side airbag includes a dimension in the longitudinal direction of the vehicle decreasing continuously from the upper end to the lower end;
   the upper portion is formed to be deployed before the lower portion upon deployment of the side airbag;
   the lower portion deploys by being pulled up by the deploying force of the upper portion, when the upper portion of the side airbag is being deployed; and
   wherein the side airbag is configured to deploy in a position such that the shoulder region contacts the concave portion and a portion of the side airbag around the concave portion during a side collision of the vehicle from the early stage of the side collision to the late stage of the side collision, and the concave portion and the portion of the side airbag around the concave portion of the side airbag support the shoulder region from above.

2. The vehicle side airbag apparatus according to claim 1, wherein the cross-sectional area of the concave portion is smaller than the cross sectional areas of other portions of the side airbag as viewed in the longitudinal direction of the vehicle.

3. The vehicle side airbag apparatus according to claim 1, wherein a connecting member is provided at the concave portion, which connects the inner face of the side airbag on the first side and the inner face of the side airbag on the second side, wherein the second side is close to the outside of the vehicle.

4. The vehicle side airbag apparatus according to claim 1, wherein the side airbag is folded or rolled first in the longitudinal direction of the vehicle and then in the up-down direction of the vehicle and then installed in a given position.

5. The vehicle side airbag apparatus according to claim 4, wherein the side airbag is embedded in a folded or rolled state in a seatback of a seat of the vehicle.

6. The vehicle side airbag apparatus according to claim 1, wherein the inflator has an inflation gas outlet from which the gas is discharged upward.

7. The vehicle side airbag apparatus according to claim 6, wherein the inflator is provided in the side airbag.

8. The vehicle side airbag apparatus according to claim 6, wherein:
   the inflator supplies the gas to the upper chamber portion via the inflation gas outlet; and
   the inflator has a second inflation gas outlet and supplies the gas to the lower chamber portion via the second inflation gas outlet.

9. The vehicle side airbag apparatus according to claim 8, wherein the amount of gas discharged from the inflation gas outlet is larger than the amount of gas discharged from the second inflation gas outlet.

10. The vehicle side airbag apparatus according to claim 1, further comprising a partition member that is provided below the concave portion and divides the side airbag into an upper chamber portion and a lower chamber portion that is located below the upper chamber portion, wherein
    the pressure that is applied from the side airbag to the shoulder region when the shoulder region contacts the side airbag upon deployment of the side airbag is higher at the upper chamber portion than at the lower chamber portion.

11. The vehicle side airbag apparatus according to claim 10, wherein:
    the upper chamber portion has an upper chamber portion side ventilation hole;
    the lower chamber portion has a lower chamber portion side ventilation hole; and
    the cross-sectional area of the upper chamber portion side ventilation hole is smaller than the cross-sectional area of the lower chamber portion side ventilation hole.

12. A vehicle side airbag apparatus, including a side airbag mounted in a seatback of a seat of the vehicle, wherein an upper end of the side airbag is located above a shoulder region and lower than an upper end of a head region, a lower end of the side airbag is located lower than the shoulder region and lower than a chest region, when the side airbag is in a deployed state, and the side airbag covers an area extending from the shoulder region to the chest region, comprising:
    an inflator that supplies gas to the side airbag, wherein:
    the side airbag has a concave portion which is provided at a position corresponding to the shoulder region in the up-down direction of the vehicle and which is thinner in the lateral direction of the vehicle than other portions of the side airbag;
    an upper portion of the side airbag that is located above the position corresponding to the shoulder region when the side airbag is in the deployed state is longer in the longitudinal direction of the vehicle than a lower portion of the side airbag that is located below the position corresponding to the shoulder region when the side airbag is in the deployed state;
    a side shape of the deployed side airbag includes a dimension in the longitudinal direction of the vehicle decreasing continuously from the upper end to the lower end;

the upper portion is formed to be deployed before the lower portion upon deployment of the side airbag;

the lower portion deploys by being pulled up by the deploying force of the upper portion, when the upper portion of the side airbag is being deployed;

wherein the side airbag is configured to deploy in a position such that the shoulder region contacts the concave portion and a portion of the side airbag around the concave portion during a side collision of the vehicle from the early stage of the side collision to the late stage of the side collision, and the concave portion and the portion of the side airbag around the concave portion of the side airbag support the shoulder region from above;

wherein a connecting member is provided at the concave portion, which connects the inner face of the side airbag on a first side and the inner face of the side airbag on a second side close to the outside of the vehicle; and wherein the connecting member is slanted such that the end of the connecting member on the front side of the vehicle is located lower than the end of the connecting member on the rear side of the vehicle.

13. A side airbag for a vehicle side airbag apparatus, wherein an upper end of the side airbag is located above a shoulder region and lower than an upper end of a head region, a lower end of the side airbag is located lower than the shoulder region and lower than a chest region, when the side airbag is in a deployed state; and the side airbag covers an area extending from the shoulder region to the chest region, the side airbag comprising:

an upper inflation portion;

a lower inflation portion that is provided below the upper inflation portion;

an exterior surface defining a concave portion that is provided between the upper inflation portion and the lower inflation portion, wherein an inner face of the side airbag located interior of the concave portion on a first side is spaced apart from an inner face of the side airbag on a second side in the lateral direction of the vehicle when the side airbag is inflated; and a connecting member that is provided at the concave portion and connects the inner face of the side airbag on a first side and the inner face of the side airbag on a second side close to the outside of the vehicle, wherein:

the concave portion is formed such that, when the side airbag is in a deployed state, the concave portion is thinner than the upper inflation portion and the lower inflation portion;

the upper inflation portion is longer than the lower inflation portion in the longitudinal direction of the vehicle;

a side shape of the deployed side airbag includes a dimension in the longitudinal direction of the vehicle decreasing continuously from the upper end to the lower end;

the upper inflation portion is formed to be deployed before the lower inflation portion upon deployment of the side airbag;

the lower portion deploys by being pulled up by the deploying force of the upper portion, when the upper portion of the side airbag is being deployed; and wherein the side airbag is configured to deploy in a position such that the shoulder region contacts the concave portion and a portion of the side airbag around the concave portion during a side collision of the vehicle from the early stage of the side collision to the late stage of the side collision, and the concave portion and the portion of the side airbag around the concave portion of the side airbag support the shoulder region from above.

14. A vehicle side airbag apparatus, comprising:

a side airbag; and an inflator that supplies gas to the side airbag, wherein:

the upper end of the side airbag is located higher than a shoulder region and the lower end of the side airbag is located lower than the shoulder region, when the side airbag is in a deployed state;

the side airbag has a concave portion which is provided at a position corresponding to the shoulder region in the up-down direction of the vehicle and which is thinner in the lateral direction of the vehicle than other portions of the side airbag;

an upper portion of the side airbag that is located above the position corresponding to the shoulder region when the side airbag is in the deployed state is longer in the longitudinal direction of the vehicle than a lower portion of the side airbag that is located below the position corresponding to the shoulder region when the side airbag is in the deployed state; the upper portion is formed to be deployed before the lower portion upon deployment of the side airbag; and a connecting member is provided at the concave portion, which connects the inner face of the side airbag on a first side and the inner face of the side airbag on a second side close to the outside of the vehicle, wherein the connecting member is slanted such that the end of the connecting member on the front side of the vehicle is located lower than the end of the connecting member on the rear side of the vehicle.

* * * * *